Figure 1:
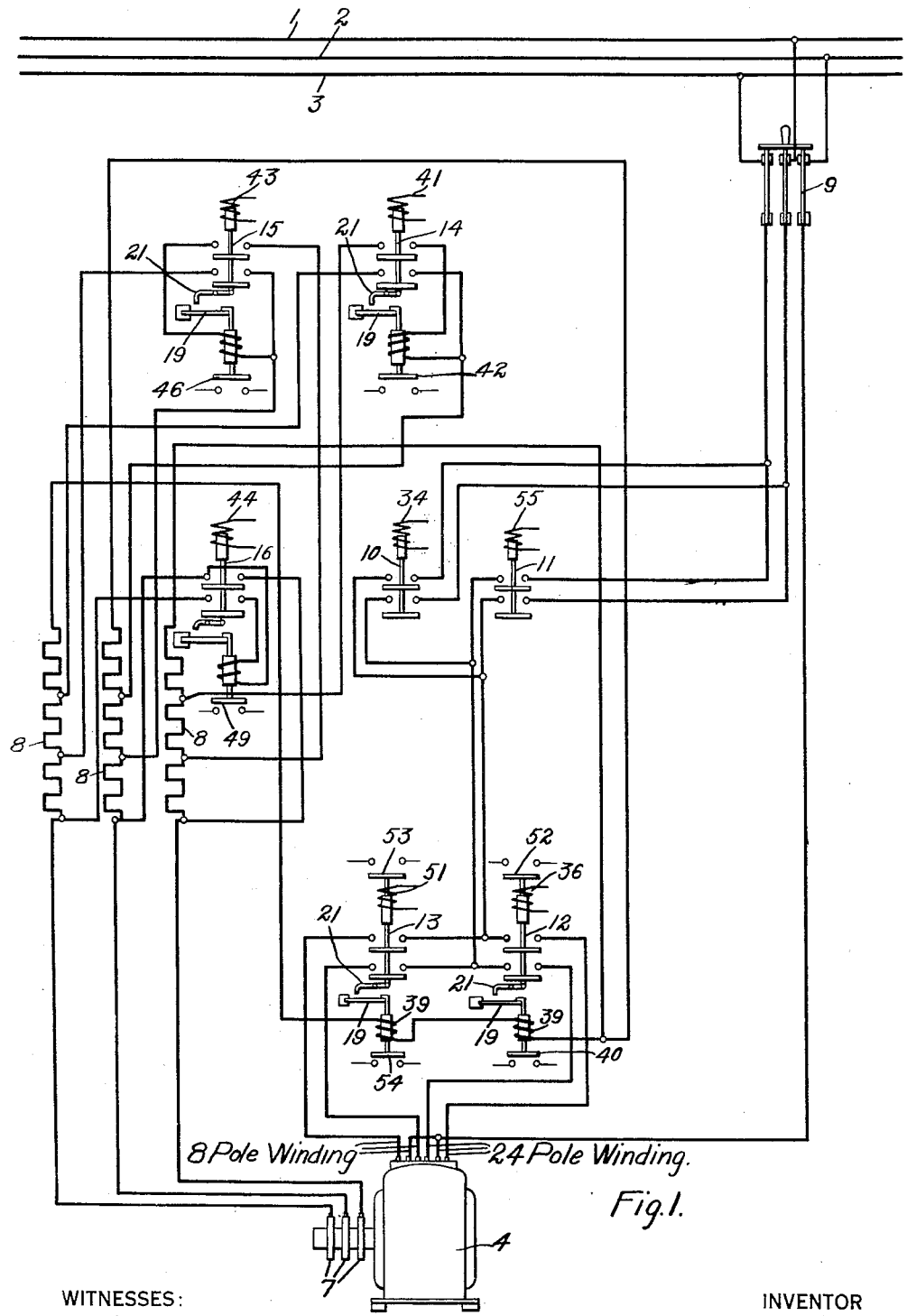

June 10, 1924.

H. L. KEITH

MOTOR CONTROL SYSTEM

Filed Feb. 15, 1919

1,497,448

2 Sheets-Sheet 1

WITNESSES:
J. A. Helsel.
David Rines

INVENTOR
Harold L. Keith.
BY
Wesley G. Carr
ATTORNEY

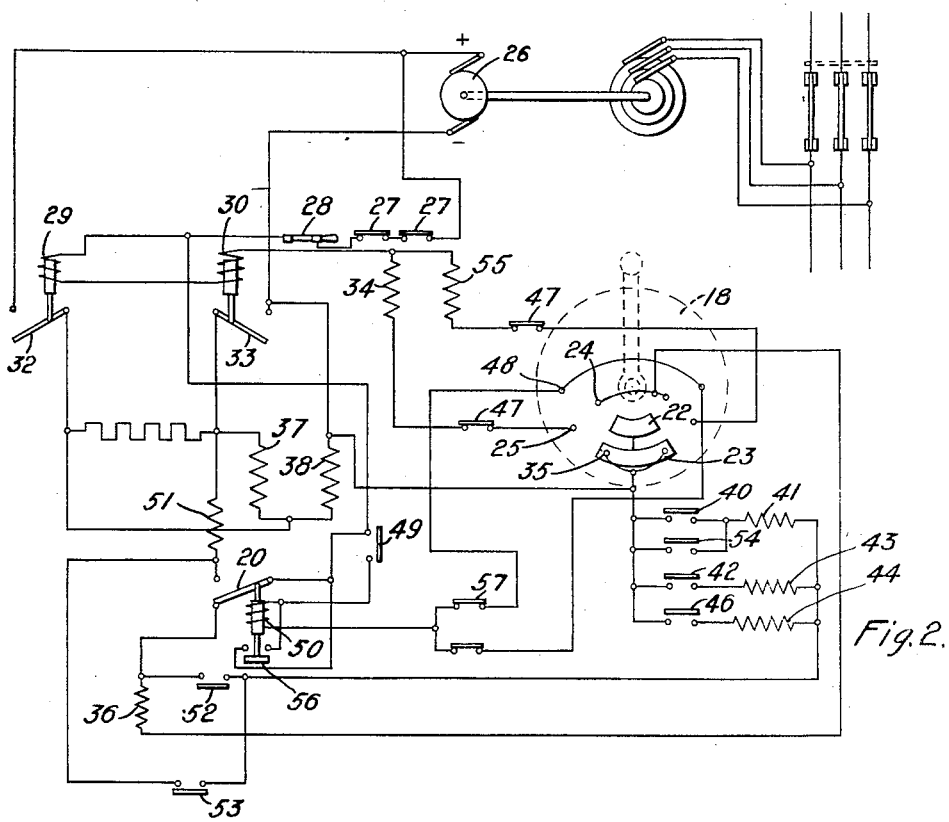
Fig. 2.
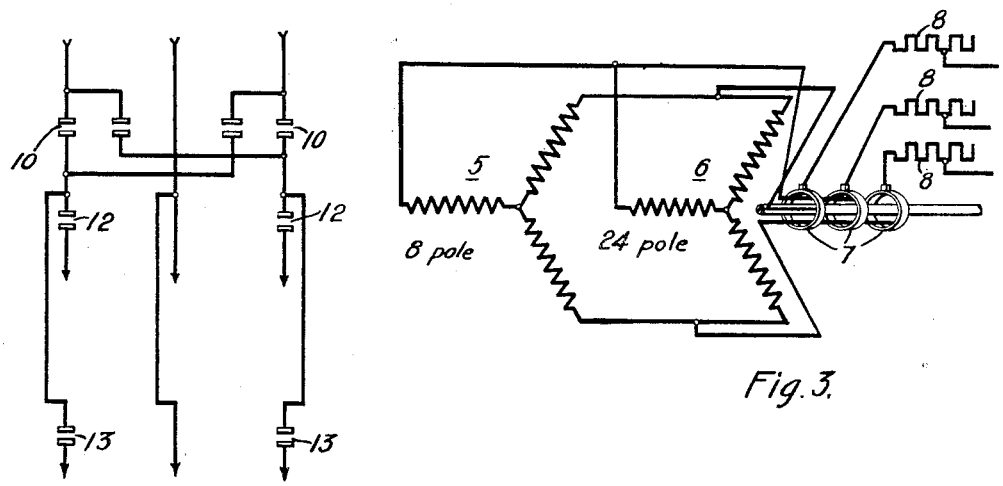
Fig. 4.
Fig. 3.

Patented June 10, 1924.

1,497,448

UNITED STATES PATENT OFFICE.

HAROLD L. KEITH, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed February 15, 1919. Serial No. 277,147.

*To all whom it may concern:*

Be it known that I, HAROLD L. KEITH, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and particularly to such systems as are employed in connection with elevators, hoists and similar machines.

In my copending application, Serial No. 100,251, filed May 27, 1916, I have disclosed a motor-control system with the aid of which two-speed alternating-current motors may be operated smoothly without shock or jar to the devices to which they are connected.

The object of the present invention is to provide an improved control system of the above-mentioned type, though my invention is of more general application.

In the system of the said application, the primary member of an induction motor is provided with two windings adapted to produce different numbers of field-magnet poles having any desired ratio to each other. The secondary member of the motor is provided with two windings which correspond, in the number of poles produced by them, to their respective primary windings. The terminals of each of the secondary windings are connected to variable resistors through a single set of slip rings.

The resistors are in circuit with the secondary winding that is energized when the low-speed primary winding is connected in circuit to start the motor. The resistor is then gradually and automatically shunted by electromagnetic switches to cause the motor to reach its normal speed with the low-speed winding in circuit. The circuit of the low-speed winding is broken, the high-speed winding is connected in circuit and the resistor is, at the same time, again inserted into the secondary circuit. The resistor is gradually shunted, as before, to accelerate the motor to its normal operating speed with the high-speed winding in circuit.

The low-speed connections are established when a two position controller occupies one of its positions and the high-speed connections when the controller occupies its other position. The high-speed connections cannot be established, however, until after the operation of a current-limit relay which is mechanically connected to each of the reversing switches.

If the controller should happen to be actuated quickly to its full-speed position, the current-limit relay, particularly if the motor is operating under a heavy load, might close too soon; either directly upon the closing of the reversing switch or at a time previous to the short-circuiting of the entire resistor during low-speed operation. In either event, the result would be a premature operation of the transfer relay to connect the motor circuits at once for high-speed operation. This is undesirable for a number of reasons, among them that energy is unnecessarily wasted when the motor is prematurely operated at high speed and the torque available for lifting heavy loads is greater when the low-speed winding is operative.

Specifically stated, the object of my present invention is to insure the initial operation of the motor at low speed and the subsequent operation at high speed only after the resistor has first been entirely short-circuited during the period of low-speed operation.

I effect this result, in the embodiment of my invention which is here shown, by dispensing altogether with the above-mentioned current-limit relays. I control the energization of the transfer-relay coil by a current-limit relay which is mechanically connected to the last accelerating switch to operate. This coil is therefore energized at a predetermined time after, and not before, this accelerating switch is closed. As the accelerating switches are immediately thereupon reopened to reinsert the resistor into circuit preparatory to high-speed operation, I provide means for maintaining the transfer relay closed independently of the mechanically-connected relay. The transfer of connections is thus effected at the exact moment required, the operation is more positive in its action and the apparatus is cheaper, because requiring a smaller number of parts.

My invention will be described in connection with the accompanying drawing in which Fig. 1 is a diagrammatic view of the main circuits and apparatus embodying my invention. Fig. 2 is a similar view of the control circuits. Fig. 3 is a diagrammatic representation of the secondary circuits of the motor shown in Fig. 1. Fig. 4 illustrates a schematic arrangement of the connection of the source to the primary windings of the motor. It will be noted that the main circuits and control circuits have been illustrated in separate views for the sake of clearness.

Referring particularly to Fig. 1, line conductors 1, 2 and 3, which may be connected to any suitable source of alternating current, supply energy to an alternating-current motor 4 which is provided with two primary windings wound for eight poles and twenty-four poles, respectively, as indicated by the accompanying legends. It will be understood that the numbers of poles produced by the primary windings are taken by way of example only and that any desired ratio may exist between the numbers of poles produced by the respective windings.

As shown in Fig. 3, the secondary member of the motor 4 is provided with phase windings 5 and 6 which are respectively arranged to produce eight poles and twenty-four poles corresponding to the primary windings. The windings 5 and 6, which are in parallel relation, are connected to a single set of collector rings 7. Three variable resistors 8, which are respectively connected to the collector rings 7, are in circuit with each of the windings 5 and 6.

Referring again to Fig. 1, the primary circuits of the motor are controlled by a manually operable switch 9 and reversing switches 10 and 11 which determine the direction of operation of the motor 4 when either of the primary windings is in circuit. The circuits of the twenty-four-pole or low-speed winding are controlled by a double-pole electromagnetic switch 12, and the circuits of the eight-pole or high-speed winding are controlled by a similar electromagnetic switch 13. One terminal of each of the primary windings is connected to line conductor 2 directly through switch 9. The resistors 8 are shunted during the normal operation of the motor by a series of progressively operable electromagnetic switches 14, 15 and 16. A relay 49 is mechanically connected to the switch 16 for a purpose which will appear hereinafter. The relay 49 may, if desired, be replaced by a switch rigidly connected to the switch 16, so as to close the circuit which it controls simultaneously with the operation of the switch 16, but such replacement is less advantageous, as will be pointed out later. A switch 56 is mechanically connected to a transfer relay 20, mentioned below, for the purpose of establishing a maintaining circuit for the actuating coil 50 of this relay independently of the relay 49. Any equivalent means for establishing the maintaining circuit may be employed, as, for example, a switch having an actuating coil which may be energized by the relay 49 simultaneously with the energization of the coil 50.

Reference may now be had to Fig. 2, in which the control circuits are diagrammatically illustrated. A master switch or controller 18, which may be located within the elevator car, controls the circuits of the actuating coils of the several switches for controlling the main circuits described above in connection with Fig. 1. The actuating coil of each of the accelerating switches 14, 15 and 16 is controlled by a current-limit relay that is connected to the preceding switch to close. While the relays may be connected, in any suitable manner, to the respective switches, they are, for convenience, represented as being normally held open by springs 19. The pressure of the springs 19 is released by a lever arm 21 when the corresponding accelerating switch is closed, thereby permitting the relays to close by gravity except when their actuating coils are traversed by a current which exceeds a predetermined value.

The controller 18 has two operative positions, in one of which it completes a circuit for the actuating coil of the one or the other of the reversing switches 10 and 11 and for the actuating coil of switch 12, which controls the circuit connections of the low-speed primary winding of the motor. In the second position of the controller, a circuit is partially completed for the actuating coil of what may be termed a transfer relay 20. In the system of my above mentioned application, this circuit is also controlled by the current-limit relays connected to reversing switches 10 and 11. These current limit relays are omitted from the present system. The transfer relay 20 operates to open the circuit of the magnet coil of switch 12 and to effect the closing of switch 13 and thereby change the number of poles produced in the primary member of the motor.

It may be assumed that the various switches are in their illustrated or inoperative positions. The circuits of the primary windings of the motor are open, and the resistors 8 are in circuit with the secondary windings of the motor. It may be assumed, further, that it is desired to cause the elevator car to ascend. The operating handle of the master switch 18 is rotated in a clockwise direction, as viewed in Fig. 2, to cause movable contact segments 22 and 23 to engage stationary contact members 24 and 25, respectively.

A circuit is completed which extends from the positive terminal of a direct-current generator 26 through hatchway limit switches 27, emergency switch 28, actuating coils 29 and 30 of brake-controlling switches 32 and 33, actuating coil 34 of switch 10, hatchway limit switch 47, contact member 25, contact segment 23, and contact member 35, to the negative terminal of the generator 26. The limit switches 27 and 47 have different functions, the former being adapted for operation only when the elevator car has travelled beyond predetermined limits, as is well understood by those familiar with the art.

A second circuit is completed which extends from the emergency switch 28 through transfer relay 20, which is in its lower position, as shown, actuating coil 36 of line switch 12, contact member 24, contact segments 22 and 23, and contact member 35 to the negative terminal of the generator. The coils 29 and 30 are energized to complete the circuits of the magnet coils 37 and 38 of the usual electromagnetic brakes (not shown) and thus effect the release of the brakes.

The coil 34 is energized by the circuit first traced to close reversing switch 10 in order to insure that the motor 4 will operate in the proper direction. The coil 36 is energized, also, by the second circuit to close line switch 12 and thereby complete the circuit of the twenty-four pole or low-speed winding of the motor.

At the time of starting the motor, the current traversing the secondary circuit comprising the twenty-four-pole secondary winding, the resistors 8 and coils 39 of the current-limit relays, respectively connected to switches 12 and 13, is of such value that the current-limit relay 40, which is connected to the switch 12, is held in its open position. The relay 40 controls the circuit of the actuating coil 41 of accelerating switch 14.

When the current traversing the secondary circuit falls to a predetermined value, the relay 40 closes to complete a circuit for the coil 41, and the switch 14 is closed to complete a shunt for one section of each of the resistors 8. A current-limit relay 42, that is mechanically connected to accelerating switch 14, controls the circuit of the actuating coil 43 of switch 15, and the latter switch is closed to shunt a second section of each resistor 8 when the current traversing the secondary circuit again falls to the predetermined value. In a similar manner, switch 16, which is provided with an actuating coil 44 that is controlled by a current-limit relay 46 connected to switch 15, operates automatically in accordance with the value of the current traversing the secondary circuit to complete shunt circuits for the entire resistors 8.

The removal of the resistors from the secondary circuit gradually accelerates the motor to its normal speed, with the twenty-four-pole winding in circuit. When the controller is actuated to its second position, the contact segment 23 engages a contact member 48 but maintains its engagement with contact members 25 and 35. The current-limit relay 49, that is connected to the accelerating switch 16, closes to complete a circuit for the actuating coil 50 of transfer relay 20 when the current traversing the secondary circuit falls to a predetermined value.

This circuit extends from the positive terminal of the generator 26, through hatchway limit switches 27, emergency switch 28, the relay 49, coil 50, a hatchway limit switch 57, contact member 48, contact segment 23 and contact member 35 to the negative terminal of the generator. The coil 50 is energized to actuate the transfer relay 20 to its upper position to open the circuit of the actuating coil 36 of line switch 12 and to close a circuit for the actuating coil 51 of line switch 13. This circuit extends from the relay 20, which is connected to the positive terminal of the generator 26, through coil 51 and switch 33 to the negative terminal of the generator.

The line switch 12 opens the circuit of the twenty-four-pole winding, and an interlock 52, that is connected thereto, opens to break the circuits of the coils 41, 43 and 44 of the corresponding accelerating switches 14, 15 and 16. The entire resistors 8 are thus inserted in circuit with the secondary windings of the motor. The coil 50 is maintained energized, upon the opening of its circuit by the switch 49, by the switch 56.

The line switch 13 closes to complete the circuit of the eight-pole or high-speed winding. The eight-pole secondary winding is now energized and substantially no current traverses the twenty-four pole secondary winding because the various electromotive forces impressed upon its conductors are substantially equal and in opposite directions. An interlock 53, that is connected to the switch 13, again completes the circuit of actuating coil 41 of accelerating switch 14 when the current-limit relay 54, connected to the line switch 13, closes in response to a decrease in the current traversing the secondary circuit to a predetermined value. The accelerating switches operate automatically in the same manner as described above in connection with the low-speed winding to accelerate the motor to its normal operating speed, with the high-speed winding connected in circuit.

The operation of accelerating the motor has been described upon the assumption that the controller is operated step-by-step in accordance with the speed of the motor. It will be understood, however, that the controller handle may be actuated quickly from its "off" position to its full-speed position, and the various switches will operate automatically, in the same order as that described above, to accelerate the motor. The transfer relay 20 operates to change the line connections from one primary winding to the other after the closing of the last accelerating switch to close. The accelerating switches operate automatically upon the current traversing the secondary circuit falling to predetermined values and are caused to repeat their operation when one line switch is opened and the other is closed by the operation of the transfer relay. The operation of the motor, first at one speed and then at the other, is thus assured.

To decrease the speed of the motor, the operating handle may be actuated toward its inoperative position. When it occupies its intermediate position, the circuit of the coil 50 of relay 20 is broken at contact member 48. The transfer relay 20 falls to its lower position to open the circuit of the actuating coil 51 of line switch 13 and to establish the circuit for actuating coil 36 of line switch 12. The interlock 53 opens the circuits of the actuating coils of the accelerating switches to insert the resistors 8 in the secondary circuit. The circuit of coil 41 of switch 14 is again established by the interlock 52 connected to line switch 12. The accelerating switches close in order as the current traversing the secondary circuit falls to predetermined values. If the secondary current does not rise to the predetermined value at which the relays 40, 42 and 46 are held open, the switches close immediately.

At the instant the change in connections from the eight-pole primary winding to the twenty-four pole winding occurs, the motor is operating above the synchronous speed for this connection. As an induction motor driven above synchronous speed operates as a generator, an electrical braking action is provided which quickly retards the motor and the elevator car. The insertion of the resistors in the secondary circuit during the change in connections and the step-by-step removal of the resistors effect a gradual reduction from the higher synchronous speed to the lower synchronous speed. The speed of the car may thus be quickly reduced from, for example, 300 feet to 100 feet per minute without shock or jar, from which speed accurate stops are easily made.

To stop the motor, the controller is actuated to its "off" position. The control circuits are thus opened, and the motor is disconnected from the line. The switches 32 and 33 open the circuits of the brake coils 37 and 38 to permit the application of the magnet brakes. The car is thus brought easily and smoothly to rest. The opening of the control circuits effects the opening of the accelerating switches, and the resistors are inserted in the secondary circuit in preparation for the succeeding operation of the motor.

To cause the motor to rotate in the opposite direction to lower the elevator car, it is only necessary to actuate the controller handle in the opposite direction from its "off" position to effect the closing of reversing switch 11 which is provided with an actuating coil 55. The sequence of operations is otherwise the same as previously described in connection with the ascent of the car. In case the operator neglects to stop the motor before the car reaches either of its limits of travel, the hatchway limit switches 57 and 47 may be successively opened by any usual or suitable mechanical means controlled by the car to open the control circuits in the same sequence as if the controller handle were thrown to its off position. The car is thus automatically and gradually brought to a stop. In case it is impossible to stop the car by means of the master switch 18, it is only necessary to open the manually operable emergency switch 28, or the hatchway limit switches 27 will open in case of overtravel (both sides of the control circuit being opened to guard against grounds or short-circuit), whereupon, all of the control circuits are de-energized and the car is brought to rest upon the opening of all of the main and control switches and the application of the brakes.

As stated above, a switch may be substituted for the relay 49 that shall close simultaneously with the switch 16. The relay 49, however, permits the motor to reach full speed while operating on the twenty-four pole winding before the transfer of connections is effected. The advantages of the system of my above-mentioned application are thus retained, but the operation is more reliable and the apparatus is less expensive.

While I have shown and described my invention as employed in connection with a three-phase induction motor having windings of a particular type and producing numbers of poles bearing a certain ratio to each other, it will be understood that the various features are shown by way of example only, and that any other suitable arrangement may be substituted therefor. The control circuits are shown and described as being controlled by means of direct current, but it will be obvious that alternating current may be employed by providing electromagnets of a character suitable for such use. Many modifications will occur to those skilled in the art to which my invention appertains, and it is understood that such changes may be made as fall within the scope of the appended claims without departing from the spirit of my invention.

I claim as my invention:

1. The combination with an electric motor having a plurality of primary windings, a resistor associated with said motor and means for short-circuiting said resistor, of means for rendering the one or the other of said windings effective to produce a plurality of operating speeds, and an electroresponsive switch mechanically connected to said short-circuiting means for controlling the electrical connections of one of said windings.

2. The combination with a two-speed alternating-current electric motor having a resistor associated therewith and a switch for short-circuiting said resistor, of means for insuring the initial operation of said motor at the lower speed, said means comprising an electromagnetic switch mechanically connected to said short-circuiting switch for effecting the operation of said motor at the second and higher speed.

3. The combination with a motor having a resistor associated therewith, a switch for short-circuiting said resistor and a two-position controller for arranging the motor connections to effect the operation of said motor at each of two speeds and to effect the acceleration of said motor in each of its two positions, respectively, of a current-limit relay mechanically connected to said short-circuiting switch for controlling the motor connections for operation at one of said speeds.

4. The combination with an electric motor having a primary member adapted to produce different numbers of poles and a secondary member having a resistor in circuit therewith, of a pair of switches for connecting said primary member to produce one or another of said numbers of poles, a transfer switch for rendering one of said pair of switches ineffective and the other of said pair of switches effective, a switch for short-circuiting said resistor and a current-limit relay mechanically connected to said short-circuiting switch for controlling said transfer switch.

5. The combination with an electric motor having a primary member adapted to produce different numbers of poles and a secondary member having a resistor in circuit therewith, of a pair of switches for connecting said primary member to produce one or another of said numbers of poles, a transfer switch for rendering one of said pair of switches ineffective and the other of said pair of switches effective, said transfer switch having an actuating coil, a switch for short-circuiting said resistor, a current-limit relay mechanically connected to said short-circuiting switch for closing the circuit of said coil and a switch for maintaining said first-named coil energized.

6. The combination with an electric motor having a primary member adapted to produce different numbers of poles and a secondary member having a resistor in circuit therewith, of a pair of switches for connecting said primary member to produce one or another of said numbers of poles, each having an actuating coil, a transfer switch having two operative positions in each of which it controls the circuit of one of said coils, said transfer switch normally occupying one of said positions and having an energizing coil for actuating it to said other position, a plurality of progressively actuated switches for short-circuiting said resistor, and a current-limit relay mechanically connected to the last of said progressively actuated switches to operate for closing the circuit of said transfer-switch coil.

7. The combination with an alternating-current motor having a low-speed and a high-speed primary winding, and a secondary winding, of means for accelerating the motor when its low-speed winding is effective and means controlled by said accelerating means and in accordance with the value of the current traversing the secondary winding, for rendering the high-speed winding effective and the low-speed winding ineffective.

In testimony whereof I have hereunto subscribed my name this 31st day of Jan., 1919.

HAROLD L. KEITH.